United States Patent
Hansen

(10) Patent No.: US 7,417,538 B2
(45) Date of Patent: *Aug. 26, 2008

(54) DYNAMICALLY TASKING ONE OR MORE SURVEILLANCE RESOURCES

(75) Inventor: Eric L. Hansen, Parker, CO (US)

(73) Assignee: Raytheon Company, Waltham, MA (US)

(*) Notice: Subject to any disclaimer, the term of this patent is extended or adjusted under 35 U.S.C. 154(b) by 115 days.

This patent is subject to a terminal disclaimer.

(21) Appl. No.: 11/050,195

(22) Filed: Feb. 3, 2005

(65) Prior Publication Data

US 2006/0181405 A1    Aug. 17, 2006

(51) Int. Cl.
*G08B 1/08* (2006.01)
(52) U.S. Cl. .............. 340/539.13; 340/539.1; 340/539.16; 340/506; 340/531; 340/7.2
(58) Field of Classification Search ............. None
See application file for complete search history.

(56) References Cited

U.S. PATENT DOCUMENTS 7,088,240 B2 * 8/2006 Inata et al. ............. 340/539.18

2005/0001755 A1 * 1/2005 Steadman et al. ............. 342/14

OTHER PUBLICATIONS

European Patent Office, PCT Search Report and Written Opinion, Application No. PCT/US/2006/003685, Mailed Jul. 10, 2006, 11 pages.
El-Rewini et al., Task Scheduling in Multiprocessing Systems, Computer, IEEE Service Center, Los Alamitos, California, vol. 28, No. 12, pp. 27-37, Dec. 1, 1995.
Berry, P.E., "A Dynamic Asset Tasking Technique for Integrated Surveillance Operations," [online], pp. 1-15, http://www.dsto.defence.gov.au/publica, 12 pages, Retrieved Jun. 15, 2006.

* cited by examiner

*Primary Examiner*—Julie Lieu
(74) *Attorney, Agent, or Firm*—Baker Botts L.L.P.

(57) ABSTRACT

In one embodiment, a system for dynamically tasking one or more surveillance resources includes a core module identifying one or more surveillance resources. The surveillance resources each include one or more sensors. The system also includes one or more links between the core module and one or more target definitions. The target definitions each define one or more targets for surveillance, and the links logically link the surveillance resources identified in the core module to the targets defined in the target definitions. Modification to one or more of the links dynamically tasks the surveillance resources without modification to the core module and without logically unlinking the core module from the target definitions.

27 Claims, 3 Drawing Sheets

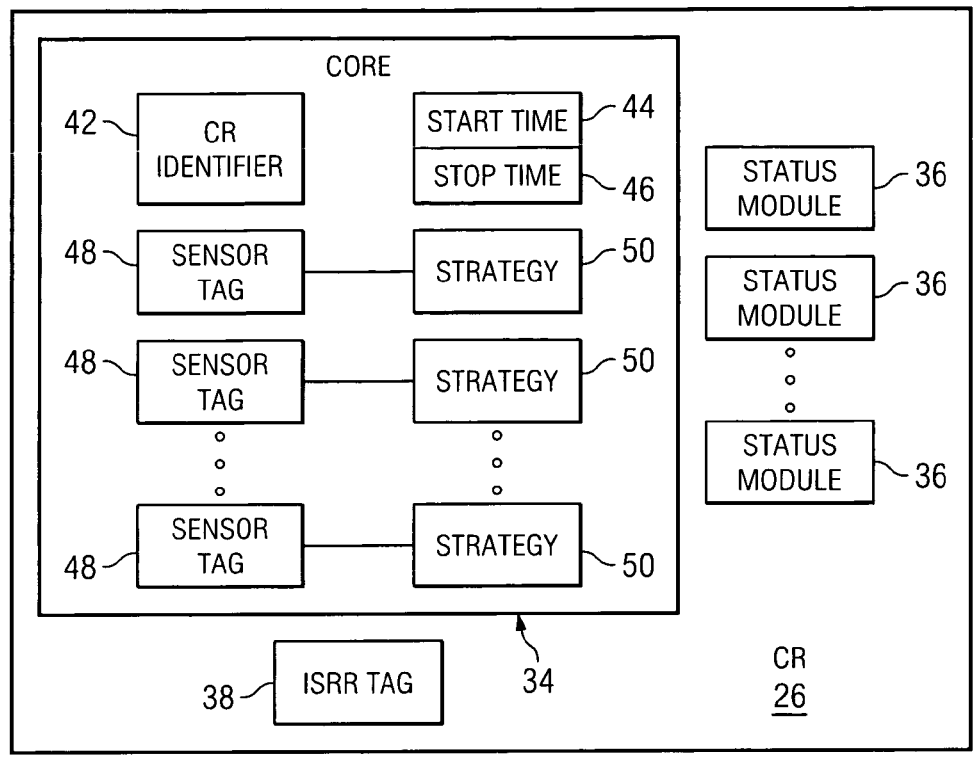
FIG. 3
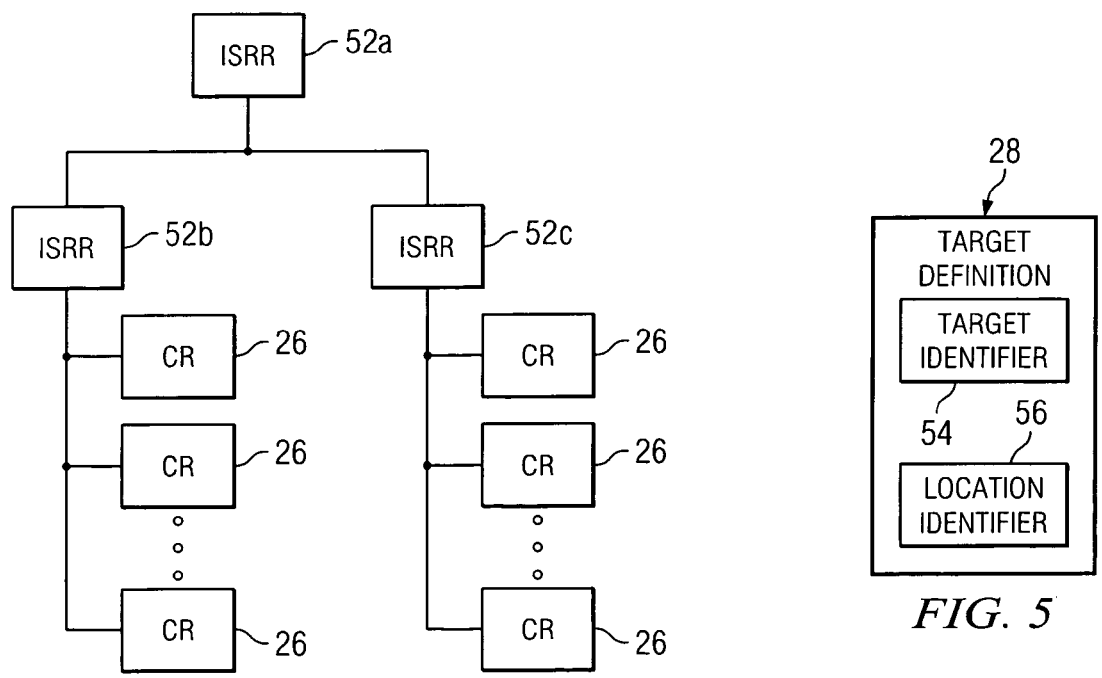
FIG. 4
FIG. 5

DYNAMICALLY TASKING ONE OR MORE SURVEILLANCE RESOURCES

TECHNICAL FIELD OF THE INVENTION

This invention relates generally to surveillance resources and more particularly to dynamically tasking one or more surveillance resources.

BACKGROUND

In current collection systems, tasking one or more surveillance resources (such as, for example, one or more sensors on one or more spacecraft) to surveil a target typically involves generating one or more tasks for the surveillance resources, getting a central tasking authority (CTA) to approve the tasks, and then deploying the tasks to the surveillance resources. Generating a task for a surveillance resource often requires specialized expertise, and approval from a CTA often requires considerable time. As a result, current collection systems typically do not enable users to readily task surveillance resources to surveil targets.

SUMMARY

According to the present invention, disadvantages and problems associated with data communication may be reduced or eliminated.

In one embodiment, a system for dynamically tasking one or more surveillance resources includes a core module identifying one or more surveillance resources. The surveillance resources each include one or more sensors. The system also includes one or more links between the core module and one or more target definitions. The target definitions each define one or more targets for surveillance, and the links logically link the surveillance resources identified in the core module to the targets defined in the target definitions. Modification to one or more of the links dynamically tasks the surveillance resources without modification to the core module and without logically unlinking the core module from the target definitions.

Particular embodiments of the present invention may provide one or more technical advantages. As an example, particular embodiments reduce time requirements typically associated with tasking surveillance resources. Particular embodiments simplify instructions used to task surveillance resources. Particular embodiments lend modularization, standardization, or both to tasking surveillance resources. In particular embodiments, such modularization, standardization, or both enables thin tasking. In particular embodiments, users need not have specialized expertise to task surveillance resources. Particular embodiments enable users to readily task and retask surveillance resources in response to observed events. Certain embodiments may provide all, some, or none of these technical advantages. Certain embodiments may provide one or more other technical advantages, one or more of which may be readily apparent to those skilled in the art from the figures, descriptions, and claims herein.

BRIEF DESCRIPTION OF THE DRAWINGS

To provide a more complete understanding of the present invention and the features and advantages thereof, reference is made to the following description, taken in conjunction with the accompanying drawings, in which:

FIG. 3 illustrates an example collection requirement (CR) in the collector system illustrated in FIG. 2;

FIG. 4 illustrates example Intelligence, Surveillance, and Reconnaissance Requirements (ISRRs);

FIG. 5 illustrates an example target definition in the CR illustrated in FIG. 3.

DESCRIPTION OF EXAMPLE EMBODIMENTS

Figure 1:
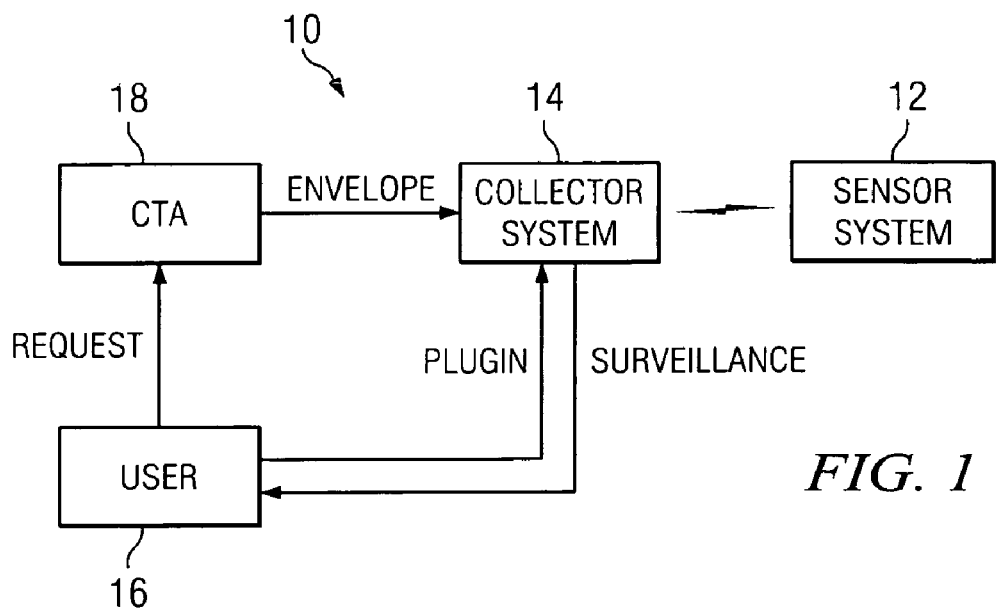
FIG. 1 illustrates an example system for dynamically tasking one or more surveillance resources.

FIG. 1 illustrates an example system 10 for dynamically tasking one or more surveillance resources. System 10 includes one or more sensor systems 12, a collector system 14, one or more users 16, and a CTA 18. A sensor system 12 includes one or more components for surveilling one or more targets and communicating the surveillance to collector system 14. As an example and not by way of limitation, a sensor system 12 may include one or more spacecraft (such as, for example, one or more unmanned satellites) including components for surveilling one or more targets and communicating the surveillance to collector system 14. As another example, a sensor system 12 may include one or more aircraft (such as, for example, one or more unmanned aerial vehicles (UAVs)) including components for surveilling one or more targets and communicating the surveillance to collector system 14. Reference to a "target" encompasses anything surveillable, where appropriate. As an example and not by way of limitation, a target may include a geographic site, a building, a facility, equipment, a vehicle, a person, or another target or a combination of two or more such targets. Reference to "surveilling" a target encompasses observing the target, where appropriate. As an example and not by way of limitation, surveilling a target may include photographing or otherwise collecting images of the target. In particular embodiments, one or more sensor systems 12 are each a combination of multiple sensor systems 12.

Collector system 14 includes one or more components for communicating commands to one or more sensor systems 12. As an example and not by way of limitation, collector system 14 may communicate one or more commands to a sensor system 12 causing sensor system 12 to surveil one or more targets and communicate the surveillance to collector system 14. Collector system 14 may communicate the commands to sensor system 12 automatically or in response to input. Collector system 14 also includes one or more components for receiving surveillance from one or more sensor systems 12 and communicating the surveillance to one or more users 16. In particular embodiments, collector system 14 directly communicates surveillance to one or more users 16, communicates surveillance to one or more users 16 through one or more intermediate entities that process the surveillance for use, or both. In particular embodiments, collector system 14 communicates with a sensor system 12 via one or more wireless communication links (such as, for example, one or more satellite communication links) between sensor system 12 and collector system 14.

Collector system 14 also includes one or more components for receiving instructions from one or more users 16, CTA 18, or both directing collector system 14 to task one or more surveillance resources, as described below. In particular embodiments, collector system 14 communicates with a user 16 via a wireline, optical, wireless, or other communication link or a combination of two or more such communication links. In particular embodiments, collector system 14 communicates with a user 16 via an Internet Protocol (IP)-based communication network. To direct collector system 14 to task one or more surveillance resources, a user 16 communicates a plugin to collector system 14 via one or more communication links between collector system 14 and user 16 or via CTA 18. In particular embodiments, a plugin from a user 16 includes data, executable code, or both modifying one or more components (such as, for example, one or more files including data, executable code, or both stored at collector system 14) of collector system 14, adding one or more components to collector system 14, or removing one or more components from collector system 14. In particular embodiments, collector system 14 communicates with CTA 18 via a wireline, optical, wireless, or other communication link or a combination of two or more such communication links. In particular embodiments, collector system 14 communicates with CTA 18 via an IP-based communication network. To direct collector system 14 to task one or more surveillance resources, CTA 18 communicates an envelope to collector system 14 via one or more communication links between collector system 14 and CTA 18. In particular embodiments, an envelope from CTA 18 includes data, executable code, or both making one or more surveillance resources available for surveilling one or more targets. In particular embodiments, CTA 18 generates an envelope and communicates the envelope to collector system 14 in response to one or more requests from one or more users 16. In particular embodiments, collector system 14 is a combination of multiple collector systems 14.

A user 16 requests surveillance resources from CTA 18, directs collector system 14 to task surveillance resources, and uses surveillance communicated from collector system 14. As an example and not by way of limitation, a user 16 may include military personnel carrying out orders. The military personnel may request surveillance resources from CTA 18 and, if CTA 18 approves the request, use the surveillance resources to surveil one or more targets. The surveillance may help the military personnel carry out their orders. In response to one or more events, the military personnel may communicate one or more plugins to collector system 14 directing collector system 14 to task the surveillance resources according to particular needs of the military personnel. A user 16 includes a person, a computer system acting on input from one or more persons, a computer system operating substantially independent of input from one or more persons, or another user 16 or a combination of two or more such users 16. As an example and not by way of limitation, a user 16 may include military personnel, intelligence personnel, or both. As another example, a user 16 may include one or more computer systems acting on input from military personnel, intelligence personnel, or both. As another example, a user 16 may include one or more computer systems carrying out one or more tasks related to military operations, intelligence operations, or both, but operating substantially independent of input from military personnel and intelligence personnel. In particular embodiments, one or more users 16 are each a combination of multiple users 16. CTA 18 has authority over utilization of surveillance resources. As an example and not by way of limitation, CTA 18 may have authority over which sensor systems 12 surveil which targets for which users 16 at which times. CTA 18 includes a person, a computer system acting on input from one or more persons, a computer system operating substantially independent of input from one or more persons, or another CTA 18 or a combination of two or more such CTAs 18. In particular embodiments, CTA 18 is a combination of multiple CTAs 18.

Figure 2:
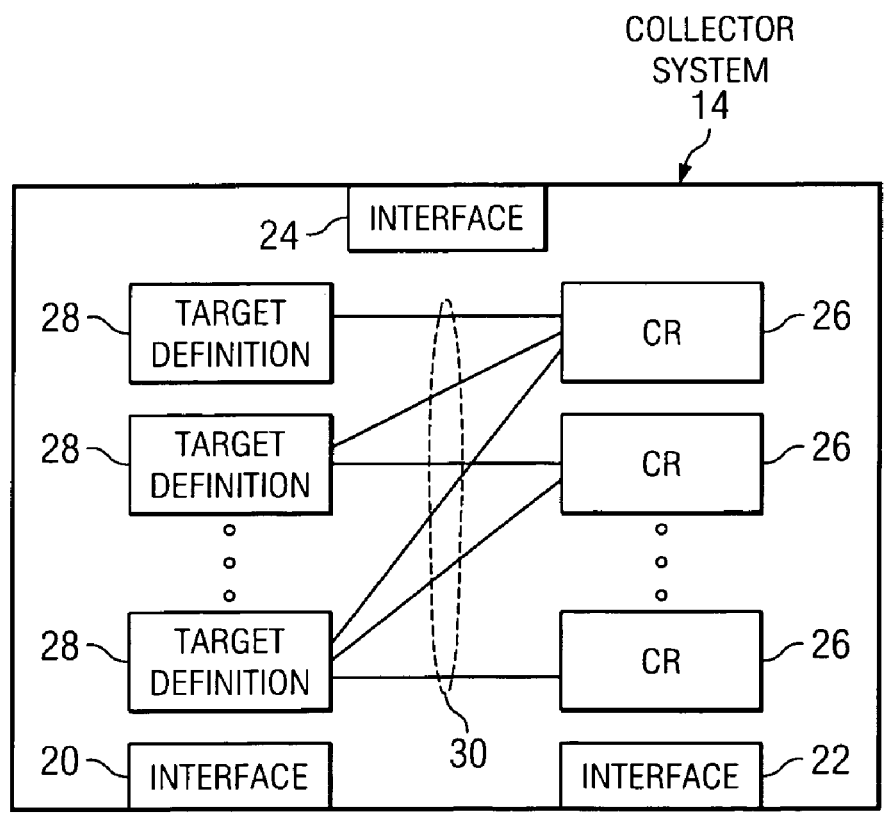
FIG. 2 illustrates an example collector system in the system illustrated in FIG. 1.

FIG. 2 illustrates an example collector system 14. Collector system 14 includes one or more interfaces 20 for communication with one or more users 16, an interface 22 for communication with CTA 18, and one or more interfaces 24 for communication with one or more sensor systems 12. In particular embodiments, interfaces 20, 22, and 24 are separate from each other. In particular embodiments, two or more of interfaces 20, 22, and 24 share a hardware, software, or embedded logic component or a combination of two or more such components with each other. In particular embodiments, two or more of interfaces 20, 22, and 24 collectively provide a single interface for communication with two or more of users 16, CTA 18, and sensor systems 12. Collector system 14 also includes one or more collection requirements (CRs) 26 and one or more target definitions 28. A CR 26 defines one or more surveillance resources for surveilling one or more targets, as described below. A target definition 28 defines one or more targets for surveillance, as described below.

A target-CR link 30 provides a logical link between a CR 26 and a target definition 28 enabling application of surveillance resources defined in CR 26 to targets defined in target definition 28. A CR 26 is logically linkable to one or more target definitions 28, and vice versa. In particular embodiments, a target-CR link 30 identifies a CR 26 and a target definition 28 logically linked to each other by target-CR link 30. In particular embodiments, target-CR link 30 specifies one or more attributes of the logical link between CR 26 and target definition 28 identified in target-CR link 30. As an example and not by way of limitation, target-CR link 30 may specify one or more time intervals for target-CR link 30. During a specified time interval, target-CR link 30 may logically link CR 26 and target definition 28 identified in target-CR link 30 with each other to enable application of surveillance resources defined in CR 26 to targets defined in target definition 28. As another example, target-CR link 30 may specify a current status of target-CR link 30, such as "on" or "off." Target-CR link 30 may enable application of surveillance resources defined in CR 26 to targets defined in target definition 28 when the current status of target-CR link 30 is "on" and disable application of surveillance resources defined in CR 26 to targets defined in target definition 28 when the current status of target-CR link 30 is "off." In particular embodiments, one or more Extensible Markup Language (XML) or other files include one or more target-CR links 30.

In particular embodiments, a user 16, CTA 18, or both generate a target-CR link 30. As an example and not by way of limitation, a user 16 may want one or more targets surveilled. User 16 may generate a request for the surveillance and communicate the request to CTA 18, and the request may identify the targets that user 16 wants surveilled and specify one or more observations for collection on the identified targets. If CTA 18 approves the request, CTA 18 may generate one or more target-CR links 30 providing one or more logical links between a CR 26 defining one or more surveillance resources for collecting the specified observations and one or more target definitions 28 defining the one or more identified targets. CTA 18 may then communicate target-CR links 30 to collector system 14. As another example, in response to one or more recent events, a user 16 may want one or more targets surveilled immediately. A CR 26 at collector system 14 may define one or more surveillance resources for surveilling the targets that user 16 wants surveilled, one or more target definitions 28 at collector system 14 may define the targets that user 16 wants surveilled, and user 16 may have authorization to task the surveillance resources defined in CR 26 to surveil the targets defined in target definitions 28. User 16 may generate one or more target-CR links 30 providing one or more logical links between CR 26 and target definitions 28 and communicate target-CR links 30 in a plugin to collector system 14. The plugin may facilitate immediate surveillance of the targets that user 16 wants surveilled.

FIG. 3 illustrates an example CR 26. In particular embodiments, CR 26 defines surveillance resources for one or more intelligence disciplines. As an example and not by way of limitation, CR 26 may define surveillance resources for Imagery Intelligence (IMINT), Signals Intelligence (SIGINT), or Human-Source Intelligence (HUMINT) or a combination of two or more such intelligence disciplines. CR 26 includes core 34, one or more status modules 36, and an Intelligence, Surveillance, and Reconnaissance Requirement (ISRR) tag 38. Core 34 defines one or more elements of CR 26 that are not readily changeable. In particular embodiments, one or more Extensible Markup Language (XML) or other files include core 34. Core 34 includes a CR identifier 42, a start indicator 44, a stop indicator 46, one or more sensor tags 48, and one or more strategies 50 that each correspond to a sensor tag 48. Although a particular core 34 including particular components is illustrated and described, the present invention contemplates any suitable core 34 including any suitable components.

CR identifier 42 uniquely identifies CR 26. In particular embodiments, CR identifier 42 is a rule-based identifier. In particular embodiments, CR identifier 42 enables linking between CR 26 and one or more target definitions 28. As an example and not by way of limitation, a target-CR link 30 between CR 26 and a target definition 28 may specify CR identifier 42 to logically link target definition 28 to CR 26. In particular embodiments, a user 16 specifies CR identifier 42 to access CR 26. As an example and not by way of limitation, user 16 may address a plugin to CR 26 according to CR identifier 42 so that the plugin reaches CR 26. The plugin may modify CR 26. Start indicator 44 indicates when CR 26 becomes operational, and stop indicator 46 indicates when CR 26 becomes nonoperational. As an example and not by way of limitation, if start indicator 44 indicated that CR 26 became operational at midnight, 1 Jan. 2005, and stop indicator 44 indicated that CR 26 became nonoperational at midnight, 1 Feb. 2005, surveillance resources defined in CR 26 would be available for surveilling targets between midnight, 1 Jan. 2005, and midnight, 1 Feb. 2005.

Sensor tags 48 each identify one or more sensors in one or more sensor systems 12 for surveilling one or more targets. As an example and not by way of limitation, a first sensor tag 48 in core 34 may identify a first sensor in a first sensor system 12 and a second sensor tag 48 in core 34 may identify a second sensor in a second sensor system 12. When CR 26 is operational, collector system 14 may cause the first sensor to surveil one or more targets and first sensor system 12 to communicate the surveillance to collector system 14, cause the second sensor to surveil one or more targets and second sensor system 12 to communicate the surveillance to collector system 14, or both. A strategy 50 corresponding to a sensor tag 48 identifying a sensor indicates how the sensor should carry out surveillance. As an example and not by way of limitation, strategy 50 may indicate whether the sensor should collect one image or multiple images (such as a series of images) when surveilling one or more targets.

A status module 36 defines one or more elements of CR 26 that are readily changeable. Such ready changeability of CR 26 facilitates dynamic tasking of surveillance resources defined in CR 26. As an example and not by way of limitation, a status module 36 may provide a switch for activating and deactivating CR 26. An authorized user 16 may toggle the switch to activate CR 26 (which may cause one or more surveillance resources defined in CR 26 to begin surveilling one or more targets) and deactivate CR 26 (which may cause the surveillance resources to discontinue the surveillance). As another example, a status module 36 may specify a time interval for surveilling one or more targets. When the time interval begins, one or more surveillance resources defined in CR 26 may begin surveilling one or more targets. At the end of the time interval, the surveillance resources may discontinue the surveillance. As another example, a status module 36 may specify a time interval for one or more sensors identified in one or more sensor tags 48 in core 34 to surveil one or more targets. When the time interval begins, the specified sensors may begin surveilling one or more targets. At the end of the time interval, the specified sensors may discontinue the surveillance. In particular embodiments, one or more XML or other files include one or more status modules 36. Although particular status modules 36 are illustrated and described, the present invention contemplates any suitable status modules 36.

In particular embodiments, ISRR tag 38 identifies an ISRR 52 that is a parent of CR 26 and enables linking between CR 26 and ISRR 52. As an example and not by way of limitation, CR 26 may be a child of an ISRR 52 identified in ISRR tag 38. ISRR 52 may be a parent of multiple CRs 26. ISRR 52 may correspond to a collection problem that multiple CRs 26 may help resolve. As an example and not by way of limitation, ISRR 52 may correspond to one or more military threats to Taiwan. CRs 26 that are children of ISRR 52 may define surveillance resources for surveilling one or more targets corresponding to the military threats to Taiwan. In particular embodiments, one or more XML or other files include one or more ISRR tags 38. Although a particular ISRR tag 38 is illustrated and described, the present invention contemplates any suitable ISRR tag 38. In particular embodiments, a CR 26 need not be a child of an ISRR 52 and need not include an ISRR tag 38.

FIG. 4 illustrates example ISRRs 52. In particular embodiments, one or more XML or other files include one or more ISRRs 52. ISRR 52a is a parent of ISRRs 52b and 52c, and ISRRs 52b and 52c are each a parent of one or more CRs 26. As an example and not by way of limitation, ISRR 52a may correspond to a collection problem and ISRRs 52b and 52c may correspond to subproblems of the collection problem corresponding to ISRR 52a that CRs 26 may help resolve. In particular embodiments, a child of an ISRR 52 inherits one or more attributes from ISRR 52, which makes children of ISRR 52 manageable from ISRR 52. In particular embodiments, an ISRR 52 identifies children of ISRR 52 and indicates one or more relationships among the identified children. As an example and not by way of limitation, an ISRR 52 may identify a first CR 26, a second CR 26, and a third CR 26 that are children of ISRR 52. ISRR 52 may indicate that first CR 26 has a higher priority than second and third CRs 26; second CR 26 has a higher priority than third CR 26, but a lower priority than first CR 26; and third CR 26 has a lower priority than first and second CRs 26. The priorities of first, second, and third CRs 26 may change over time automatically or in response to input, which may focus different surveillance resources on different constituents of a collection problem corresponding to ISRR 52 over time. Although particular relationships among particular children of an ISRR 52 are described, the present invention contemplates any suitable relationships among any suitable children of an ISRR 52.

In particular embodiments, a user 16, CTA 18, or both generate a CR 26. As an example and not by way of limitation, a user 16 may want one or more targets surveilled. User 16 may generate a request for the surveillance and communicate the request to CTA 18, and the request may specify one or more observations for collection on one or more targets. If CTA 18 approves the request, CTA 18 may generate a CR 26 defining one or more surveillance resources for collecting the specified observations and communicate CR 26 to collector system 14. CR 26 would include a core 34 and may, but need not, include one or more status modules 36. CR 26 generated by user 16 may also include an ISRR tag 38, but need not include an ISRR tag 38.

FIG. 5 illustrates an example target definition 28. In particular embodiments, target definition 28 does not define a target according to type. Target definition 28 includes a target identifier 54 and a location identifier 56. Target identifier 54 uniquely identifies target definition 28. In particular embodiments, target identifier 54 is a rule-based identifier. In particular embodiments, target identifier 54 enables linking between target definition 28 and one or more CRs 26. As an example and not by way of limitation, a target-CR link 30 between a CR 26 and target definition 28 may specify target identifier 54 to logically link CR 26 to target definition 28. In particular embodiments, a user 16 specifies target identifier 54 to access target definition 28. As an example and not by way of limitation, user 16 may address a plugin to target definition 28 according to target identifier 54 so that the plugin reaches target definition 28. The plugin may modify target definition 28.

Location identifier 56 specifies a geographical location of one or more targets for surveillance. As an example and not by way of limitation, location identifier 56 may specify one or more sets of latitude and longitude coordinates identifying a geographical location of one or more targets for surveillance. As another example, location identifier 56 may specify one or more sets of coordinates of a reference grid (such as a Department of Defense (DoD) reference grid covering a particular geographical area) identifying a geographical location of one or more targets for surveillance. As another example, location identifier may specify a vector indicating a location, a direction of movement, and a speed of movement of one or more targets at a particular time. Sensor system 12, collector system 14, or both may use the vector to identify a location for later surveillance of the one or more targets. A target definition 28 need not always include a location identifier 56. As an example and not by way of limitation, one or more users 16, CTA 18, or both may generate a target definition 28 that includes a field for entry of a location identifier 56, but does not include a location identifier 56. Later, in response to one or more events, a user 16 may communicate a plugin to target definition 28 supplying a location identifier 56, which may initiate surveillance of one or more targets at a geographical location specified in location identifier 56.

In particular embodiments, a user 16, CTA 18, or both generate a target definition 28. As an example and not by way of limitation, a user 16 may want one or more targets surveilled. User 16 may generate a request for the surveillance and communicate the request to CTA 18, and the request may identify the targets that user 16 wants surveilled. If CTA 18 approves the request, CTA 18 may generate one or more target definitions 28 defining the one or more identified targets and communicate target definitions 28 to collector system 14. As another example, in response to one or more recent events, a user 16 may want one or more targets surveilled immediately. A CR 26 at collector system 14 may define one or more surveillance resources for surveilling the targets that user 16 wants surveilled, and user 16 may have authorization to task the surveillance resources defined in CR 26 to surveil the targets that user 16 wants surveilled. User 16 may generate one or more target definitions 28 defining the targets that user 16 wants surveilled and one or more target-CR links 30 providing one or more logical links between CR 26 and target definitions 28. User 16 may then communicate target definitions 28 and target-CR links 30 in one or more plugins to collector system 14. The plugins may facilitate immediate surveillance of the targets that user 16 wants surveilled.

One or more users 16, CTA 18, or both direct collector system 14 to task surveillance resources. As an example and not by way of limitation, a user 16 may want one or more targets surveilled. User 16 may generate a request for the surveillance and communicate the request to CTA 18. The request may identify the targets that user 16 wants surveilled, specify one or more observations for collection, or both. User 16 need not have specialized expertise to generate the request, and relatively simple descriptions may suffice to identify the targets, specify the observations for collection, or both. User 16 may communicate the request to CTA 18, and CTA 18 may review and approve or deny the request. If CTA 18 approves the request, CTA 18 may generate an envelope according to the request. The envelope would include a core 34 of a CR 26 and may, but need not, include one or more status modules 36, may, but need not, include one or more target definitions 28, and may, but need not, include one or more target-CR links 30. CTA 18 may communicate the envelope to collector system 14, and collector system 14 may process contents of the envelope and possibly one or more components at collector system 14 to generate one or more commands for communication to one or more sensor systems 12. Components at collector system 14 that collector system 14 may process to generate the commands may include one or more of one or more status modules 36 added to CR 26 after CTA 18 communicated the envelope to collector system 14, one or more target definitions 28 at collector system 14 before CTA 18 communicated the envelope to collector system 14 or added to CR 26 after CTA 18 communicated the envelope to collector system 14, and one or more target-CR links 30 at collector system 14 before CTA 18 communicated the envelope to collector system 14 or added to CR 26 after CTA 18 communicated the envelope to collector system 14. Collector system 14 may communicate the commands to sensor systems 12, which may then execute the commands.

As another example, a user 16 may want one or more targets surveilled immediately. User 16 may generate a plugin for the surveillance and communicate the plugin to collector system 14. Because user 16 may communicate the plugin directly to collector system 14 without going through CTA 18, the plugin may reduce time requirements otherwise associated with tasking surveillance resources. The plugin may facilitate immediate surveillance of the targets that user 16 wants surveilled and may include one or more of the following: one or more new status modules 36 facilitating surveillance of the targets user 16 wants surveilled; one or more instructions to collector system to modify one or more status modules 36 at collector system 14 to facilitate surveillance of the targets user 16 wants surveilled; one or more instructions to collector system to delete one or more status modules 36 at collector system 14 to facilitate surveillance of the targets user 16 wants surveilled; one or more new target definitions 28 identifying one or more of the targets user 16 wants surveilled; one or more instructions to collector system 14 to modify one or more target definitions 28 at collector system 14 to facilitate surveillance of the targets user 16 wants surveilled; one or more instructions to collector system 14 to delete one or more target definitions 28 at collector system 14 to facilitate surveillance of the targets user 16 wants surveilled; one or more new target-CR links 30 providing one or more logical links between one or more target definitions 28 and one or more CRs 26 facilitating surveillance of the targets user 16 wants surveilled; one or more instructions to collector system 14 to modify one or more target-CR links 30 at collector system 14 to facilitate surveillance of the targets user 16 wants surveilled; and one or more instructions to collector system 14 to delete one or more target-CR links 30 at collector system 14 to facilitate surveillance of the targets user 16 wants surveilled. User 16 need not have specialized expertise to generate the plugin, and user 16 may generate the plugin relatively quickly. The plugin may include one or more XML or other files including one or more relatively simple and relatively intuitive descriptions of one or more relatively discrete sets of instructions to collector system 14. Collector system 14 may process contents of the plugin and possibly one or more components at collector system 14 to generate one or more commands for communication to one or more sensor systems 12.

Figure 6:
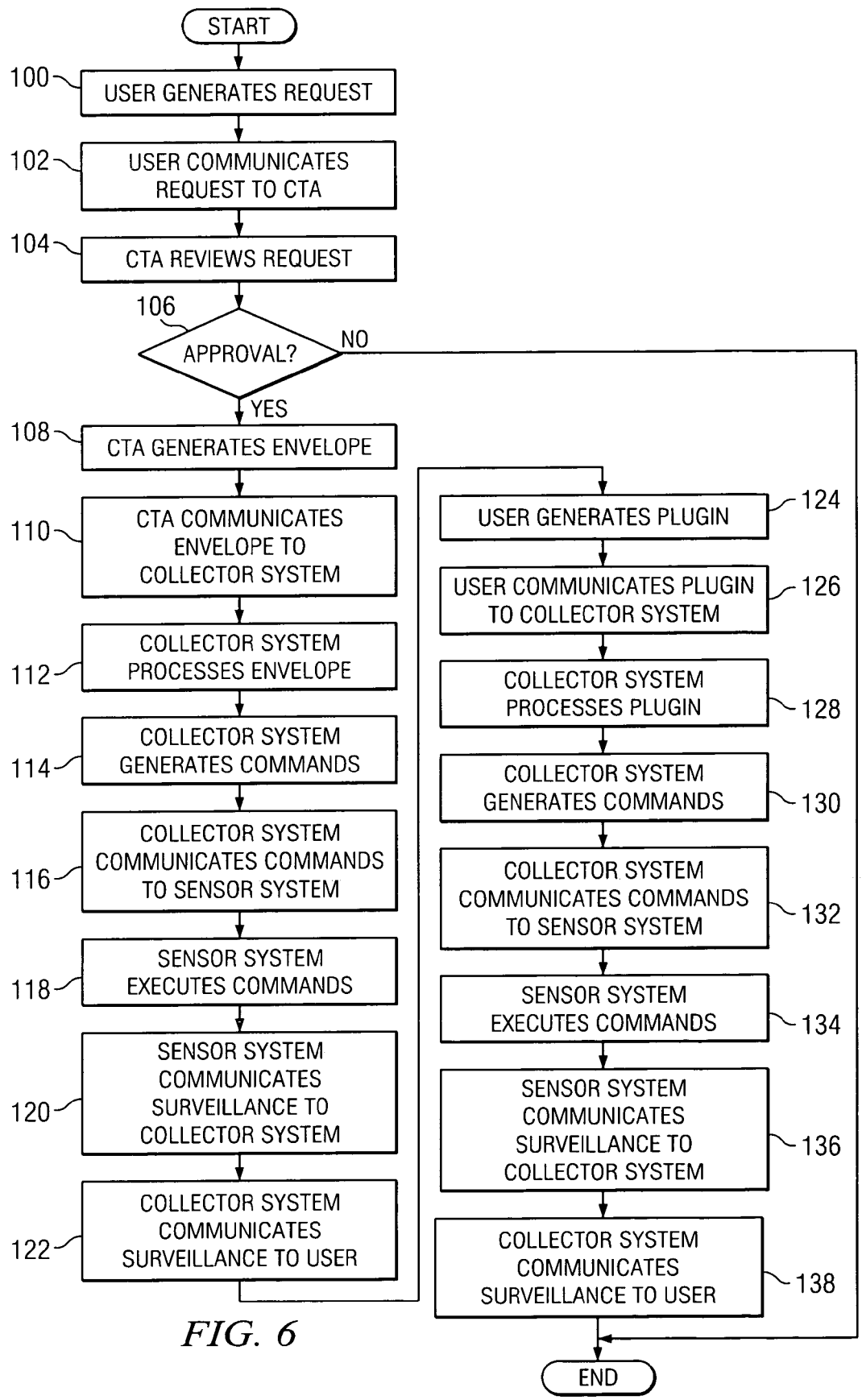
FIG. 6 illustrates an example method for dynamically tasking one or more surveillance resources.

FIG. 6 illustrates an example method for dynamically tasking one or more surveillance resources. The method begins at step 100, where a user 16 generates a request for surveillance of one or more targets. At step 102, user 16 communicates the request to CTA 18. At step 104, CTA 18 reviews the request. At step 106, if CTA 18 denies the request, the method ends. At step 106, if CTA 18 approves the request, the method proceeds to step 108, where CTA 18 generates an envelope according to the request. At step 110, CTA 18 communicates the envelope to collector system 14. At step 112, collector system 14 processes contents of the envelope. At step 114, collector system 14 generates one or more commands according to contents of the envelope. At step 116, collector system 14 communicates the commands to one or more sensor systems 12. At step 118, sensor systems 12 execute the commands. At step 120, sensor systems 12 communicate surveillance to collector system 14 resulting from execution of the commands. At step 122, collector system 14 communicates the surveillance to user 16.

At step 124, in response to one or more events, user 16 generates a plugin. As an example and not by way of limitation, the one or more events may include one or more observations made by user 16 from analysis of surveillance received at step 122. The plugin may instruct collector system 14 to task one or more of sensor systems 12 to provide immediate surveillance according to particular needs of user 16. At step 126, user 16 communicates the plugin to collector system 14. At step 128, collector system 14 processes contents of the plugin. At step 130, collector system 14 generates one or more commands according to contents of the plugin. At step 132, collector system 14 communicates the commands to one or more of sensor systems 12. At step 134, one or more of sensor systems 12 execute the commands. At step 136, sensor systems 12 communicate surveillance to collector system 14 resulting from execution of the commands. At step 138, collector system 14 communicates the surveillance to user 16, at which point the method ends. Although particular steps in the method illustrated in FIG. 6 are illustrated and described as occurring in a particular order, the present invention contemplates any suitable steps in the method illustrated in FIG. 6 occurring in any suitable order.

Although the present invention has been described with several embodiments, myriad changes, variations, alterations, transformations, and modifications may be suggested to one skilled in the art, and it is intended that the present invention encompass such changes, variations, alterations, transformations, and modifications as fall within the scope of the appended claims. The present invention is not intended to be limited, in any way, by any statement in the specification that is not reflected in the claims.

What is claimed is:

1. A system for dynamically tasking one or more surveillance resources, the system comprising:
   a core module identifying one or more surveillance resources, the surveillance resources each comprising one or more sensors; and
   one or more links between the core module and one or more target definitions each defining one or more targets for surveillance, the links logically linking the surveillance resources identified in the core module to the targets defined in the target definitions, modification to one or more of the links dynamically tasking the surveillance resources without modification to the core module and without logically unlinking the core module from the target definitions.

2. The system of claim 1, wherein modification to one or more of the links comprises toggling one or more of the links to start or stop surveillance of one or more of the targets defined in the target definitions by the surveillance resources identified in the core module.

3. The system of claim 1, wherein the target definitions define targets according to geography without reference to target type.

4. The system of claim 3, wherein the target definitions each comprise one or more sets of latitude and longitude coordinates, one or more sets of coordinates of a reference grid, or one or more vectors defining one or more of the targets.

5. The system of claim 1, wherein the core module comprises:
   one or more sensor tags each identifying one or more of the sensors;
   an identifier uniquely identifying the core module;
   a start indicator indicating when the core module becomes operational;
   a stop indicator indicating when the core module becomes nonoperational; and
   one or more strategies that each correspond to one of the sensor tags, each strategy specifying how the sensors identified in the sensor tag corresponding to the strategy should carry out surveillance.

6. The system of claim 1, further comprising one or more of:
   the target definitions;
   one or more status modules each defining one or more elements of tasking one or more of the surveillance resources identified in the core module; and
   an Intelligence, Surveillance, and Reconnaissance Requirement (ISRR) tag identifying an ISRR that is a parent of the core module.

7. The system of claim 6, wherein one or more discrete tasking modules each comprise one or more of the links between the core module and the target definitions, the target definitions, the status modules, and the ISRR tag, the discrete tasking modules dynamically tasking one or more of the surveillance resources identified in the core module without modification to the core module.

8. The system of claim 7, wherein one or more of the tasking modules generate in response to one or more events according to one or more predetermined criteria.

9. The system of claim 8, wherein one or more of the events comprise one or more events observed through surveillance provided by the surveillance resources identified in the core module.

10. The system of claim 7, wherein one or more of the tasking modules modify in response to one or more events according to one or more predetermined criteria.

11. The system of claim 10, wherein one or more of the events comprise one or more events observed through surveillance provided by the surveillance resources identified in the core module.

12. The system of claim 1, wherein one or more sensor systems each comprise one or more of the sensors, one or more of the sensor systems each comprising one or more of one or more unmanned satellites and one or more unmanned aerial vehicles (UAVs).

13. The system of claim 1, wherein surveillance comprises collecting one or more images of one or more targets.

14. A method for dynamically tasking one or more surveillance resources, the method comprising:
   using a core module, identifying one or more surveillance resources, the surveillance resources each comprising one or more sensors; and
   using one or more links between the core module and one or more target definitions, logically linking the surveillance resources identified in the core module to one or more targets defined in the target definitions for surveillance, modification to one or more of the links dynamically tasking the surveillance resources without modification to the core module and without logically unlinking the core module from the target definitions.

15. The method of claim 14, wherein modification to one or more of the links comprises toggling one or more of the links to start or stop surveillance of one or more of the targets defined in the target definitions by the surveillance resources identified in the core module.

16. The method of claim 14, wherein the target definitions define targets according to geography without reference to target type.

17. The method of claim 16, wherein the target definitions each comprise one or more sets of latitude and longitude coordinates, one or more sets of coordinates of a reference grid, or one or more vectors defining one or more of the targets.

18. The method of claim 14, wherein the core module comprises:
   one or more sensor tags each identifying one or more of the sensors;
   an identifier uniquely identifying the core module;
   a start indicator indicating when the core module becomes operational;
   a stop indicator indicating when the core module becomes nonoperational; and
   one or more strategies that each correspond to one of the sensor tags, each strategy specifying how the sensors identified in the sensor tag corresponding to the strategy should carry out surveillance.

19. The method of claim 14, further comprising one or more of:
   using the target definitions, defining the targets for surveillance;
   using one or more status modules, defining one or more elements of tasking one or more of the surveillance resources identified in the core module; and
   using an Intelligence, Surveillance, and Reconnaissance Requirement (ISRR) tag, identifying an ISRR that is a parent of the core module.

20. The method of claim 19:
   wherein one or more discrete tasking modules each comprise one or more of the links between the core module and the target definitions, the target definitions, the status modules, and the ISRR tag;
   the method further comprising, using the discrete tasking modules, dynamically tasking one or more of the surveillance resources identified in the core module without modification to the core module.

21. The method of claim 20, further comprising generating one or more of the tasking modules in response to one or more events according to one or more predetermined criteria.

22. The method of claim 21, wherein one or more of the events comprise one or more events observed through surveillance provided by the surveillance resources identified in the core module.

23. The method of claim 20, further comprising modifying one or more of the tasking modules in response to one or more events according to one or more predetermined criteria.

24. The method of claim 23, wherein one or more of the events comprise one or more events observed through surveillance provided by the surveillance resources identified in the core module.

25. The method of claim 14, wherein one or more sensor systems each comprise one or more of the sensors, one or more of the sensor systems each comprising one or more of one or more unmanned satellites and one or more unmanned aerial vehicles (UAVs).

26. The method of claim 14, wherein surveillance comprises collecting one or more images of one or more targets.

27. A system for dynamically tasking one or more surveillance resources, the system comprising:
   means for identifying one or more surveillance resources, the surveillance resources each comprising one or more sensors; and
   means for logically linking the identified surveillance resources to one or more targets defined in one or more target definitions for surveillance, modification to the logical linking dynamically tasking the surveillance resources without modification to the identification of the one or more surveillance resources and without logically unlinking the identification of the one or more surveillance resources from the target definitions.

* * * * *